US 12,398,845 B2

(12) United States Patent
West et al.

(10) Patent No.: US 12,398,845 B2
(45) Date of Patent: Aug. 26, 2025

(54) VALVE ACTUATION MECHANISM, VALVE ARRANGEMENT AND PIPE INSTALLATION FOR LH2 APPLICATIONS AS WELL AS USE THEREOF

(71) Applicants: Airbus Operations GmbH, Hamburg (DE); Airbus Operations Limited, Filton Bristol (GB)

(72) Inventors: Nicholas West, Filton Bristol (GB); Nils Lammert, Hamburg (DE)

(73) Assignees: Airbus Operations GmbH, Hamburg (DE); Airbus Operations Limited, Filton Bristol (GB)

( * ) Notice: Subject to any disclaimer, the term of this patent is extended or adjusted under 35 U.S.C. 154(b) by 67 days.

(21) Appl. No.: 18/481,392

(22) Filed: Oct. 5, 2023

(65) Prior Publication Data
US 2024/0142062 A1 May 2, 2024

(30) Foreign Application Priority Data
Oct. 28, 2022 (EP) ..................................... 22204327

(51) Int. Cl.
*F17C 13/04* (2006.01)
*F16H 49/00* (2006.01)
(Continued)

(52) U.S. Cl.
CPC ........... *F17C 13/04* (2013.01); *F16H 49/001* (2013.01); *F16K 1/2268* (2013.01);
(Continued)

(58) Field of Classification Search
CPC .. F17C 13/04; F16H 49/001; F16H 2049/003; F16K 31/53; F16K 31/524;
(Continued)

(56) References Cited

U.S. PATENT DOCUMENTS 2,906,143 A * 9/1959 Walton .................. F16H 49/001
74/625
4,616,529 A * 10/1986 Heinemann ........... F16H 49/001
74/640
(Continued)

FOREIGN PATENT DOCUMENTS

| DE | 102014107316 A1 | 11/2015 |
| DE | 102019212221 A1 | 2/2021 |
| WO | 2021148335 A1 | 7/2021 |

OTHER PUBLICATIONS

European Search Report for corresponding European Patent Application No. 22204327 dated Apr. 18, 2023; priority document.
(Continued)

*Primary Examiner* — John Bastianelli
(74) *Attorney, Agent, or Firm* — Greer, Burns & Crain, Ltd.

(57) ABSTRACT

A valve actuation mechanism for actuating a rotatable closing valve element for cryogenic applications and/or H2 applications, including a housing defining an inner area sealed by a membrane from an outer area, an input shaft configured to receive a rotational movement, the input shaft being in the outer area, an output shaft configured to be connected to the closing element, wherein the output shaft is in the inner area, and a strain wave gearing connecting the input and output shafts. The strain wave gearing includes a wave generator connected to one of the input and output shafts, a rotatable outer gear wheel connected to the other one of the input and output shafts and a stationary flexible ring gear with external teeth deformed by the wave generator to engage with internal gear teeth of the outer gear wheel. The flexible ring gear is a portion of the sealing membrane.

20 Claims, 3 Drawing Sheets

(51) Int. Cl.
  *F16K 1/226* (2006.01)
  *F16K 5/06* (2006.01)
  *F16K 31/524* (2006.01)
  *F16K 31/53* (2006.01)
  *F16K 31/60* (2006.01)
  *B64D 37/30* (2006.01)

(52) U.S. Cl.
  CPC .......... *F16K 5/0694* (2013.01); *F16K 31/524* (2013.01); *F16K 31/53* (2013.01); *F16K 31/535* (2013.01); *F16K 31/60* (2013.01); *B64D 37/30* (2013.01)

(58) Field of Classification Search
  CPC ...... F16K 31/535; F16K 31/60; F16K 1/2268; F16K 5/0694; B64D 37/30; B64D 37/005; B64F 1/28; E04H 6/44
  See application file for complete search history.

(56) References Cited

U.S. PATENT DOCUMENTS

| | | | |
|---|---|---|---|
| 4,951,518 | A | 8/1990 | Hendershot |
| 9,506,571 | B1 | 11/2016 | Mccormack |
| 10,871,213 | B2 * | 12/2020 | Ishikawa ................ F16H 55/08 |
| 2015/0292400 | A1 * | 10/2015 | Hiyoshi ................ F02B 75/045 |
| | | | 123/48 R |
| 2015/0336680 | A1 | 11/2015 | Schumacher et al. |
| 2017/0341769 | A1 | 11/2017 | Haberbusch et al. |
| 2021/0078702 | A1 | 3/2021 | Ciet et al. |

OTHER PUBLICATIONS

Wikipedia, Strain wave gearing, download on Oct. 25, 2022 from https://en.wikipedia.org/wiki/Strain_wave_gearing.

* cited by examiner

II - II

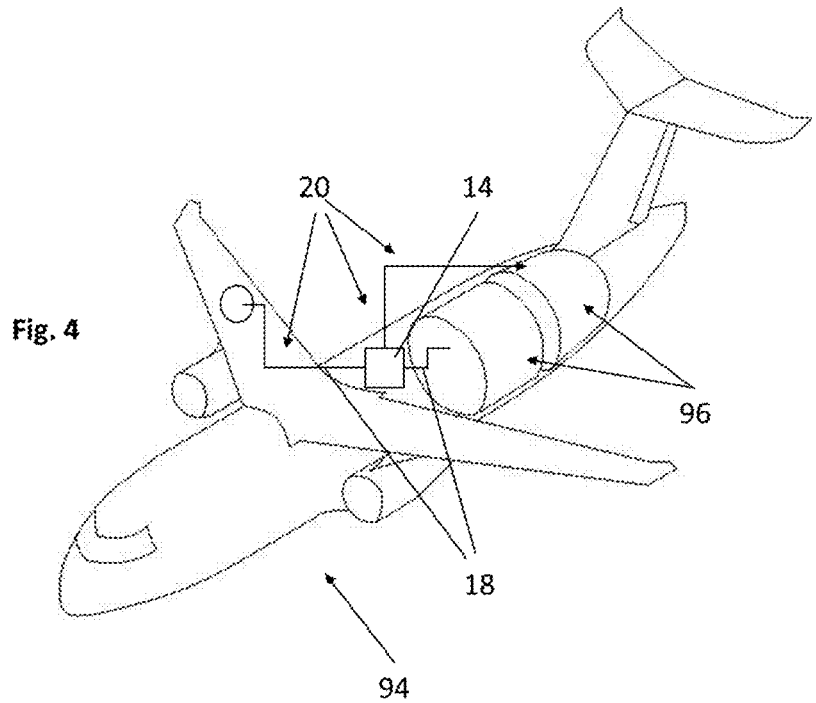
Fig. 4
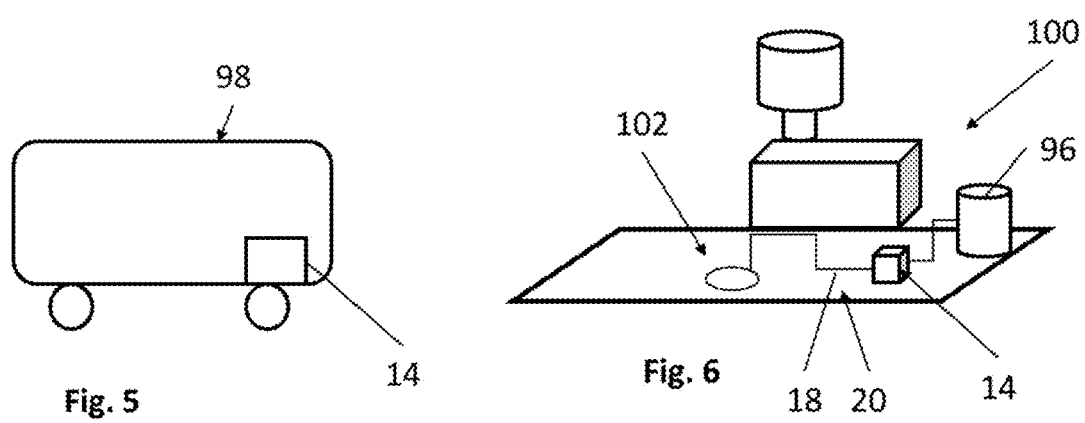
Fig. 5
Fig. 6

VALVE ACTUATION MECHANISM, VALVE ARRANGEMENT AND PIPE INSTALLATION FOR LH2 APPLICATIONS AS WELL AS USE THEREOF

CROSS-REFERENCES TO RELATED APPLICATIONS

This application claims the benefit of European patent application No. 22204327.5 filed on Oct. 28, 2022, the entire disclosures of which are incorporated herein by way of reference.

FIELD OF THE INVENTION

The invention relates to a valve actuation mechanism for actuating a valve for cryogenic applications and/or H2 applications. Further, the invention relates to a valve arrangement having such a valve actuating mechanism. Further, the invention relates to a cryogenic pipe installation for conducting liquid hydrogen, a vehicle, and an airport as possible uses of such valve arrangement.

BACKGROUND OF THE INVENTION

For technical background, reference is made to the following citations:
[1] DE 10 2014 107 316 A1
[2] US 2021/0 078 702A1
[3] WO 2021/148 335A1
[4] Wikipedia, Strain wave gearing, download on 25.10.2022 from https://en.wikipedia.org/wiki/Strain_wave_gearing
[1] to [3] relate to hydrogen installations in an aircraft.

SUMMARY OF THE INVENTION

Preferred embodiments of the invention relate to parts of installations of hydrogen systems on an aircraft, vehicles or on the ground. When an aircraft has at least one hydrogen consumer, such as a fuel cell or an engine powered at least partially with hydrogen, a hydrogen distribution system is needed on the aircraft. The hydrogen distribution system especially includes a hydrogen duct system with pipes, couplings, pipe branches, equipment and so on for distributing the hydrogen, which may be liquid hydrogen (LH2, especially cryogenic) or gaseous hydrogen (GH2). Further, for fueling aircraft powered with hydrogen, hydrogen systems are also needed on airports and eventually on tank vehicles. Especially, valves are needed to control, enable or stop flow of hydrogen.

An object of the invention is to improve a valve actuation mechanism for use with high anti-leakage requirements, especially in H2 applications, more particularly LH2 applications.

The invention provides a valve actuation mechanism for actuating a rotatable closing element of a valve for cryogenic applications and/or H2 applications, comprising:
a housing defining an inner area which is sealed by a sealing membrane from an outer area,
an input shaft for receiving a rotational movement wherein the input shaft is arranged in the outer area,
an output shaft to be connected to the closing element, wherein the output shaft is arranged in the inner area, and
a strain wave gearing connecting the input shaft and the output shaft, wherein the strain wave gearing comprises a wave generator connected to one of the input and output shafts, a rotatable outer gear wheel connected to the other of the input and output shafts and a stationary flexible ring gear with external teeth which is deformed by the wave generator to engage with internal gear teeth of the outer gear wheel, wherein the flexible ring gear is provided as a portion of the sealing membrane.

Preferably, the input shaft is selected from the group consisting of a shaft of a manual lever, a driving shaft of a motorized actuator, a driving shaft of an electric actuator, a driving shaft of a pneumatic actuator, a shaft of a crank, a shaft of a crank lever, a shaft of a handwheel.

Preferably, the housing is a canisterized housing with an internal vacuum.

Preferably, the housing defines the inner area as a first sealed chamber and further defines a second sealed chamber sealed by the sealing membrane from the first sealed chamber, wherein at least a portion of the input shaft connected to one of the wave generator and the outer gear wheel is arranged within the second sealed chamber.

Preferably, the housing has a connection means to be connected to a valve housing of a valve to be actuated.

Preferably, the housing has a bolted removable cap with static seal.

Preferably, the membrane seal comprises a pot shaped center area with an annular wall wherein at least an annular portion of the annular wall comprises the external teeth of the flexible ring gear.

Preferably, the membrane seal comprises an annular intermediate area extending essentially radially with a wave shaped expansion portion, especially a bellow shaped portion.

Preferably, the membrane seal comprises an outer rim portion or flange portion fixedly connected to the housing.

According to another aspect, the invention provides a valve arrangement for LH2 applications, comprising a valve with a closing element which is movable between a closed position and an open position by a rotation movement and a valve actuation mechanism according to any of the aforementioned embodiments.

Preferably, the valve is a ball valve or butterfly valve.

Preferably, the valve arrangement comprises a vacuum capsule boundary, wherein the housing is welded to the capsule.

According to another aspect, the invention provides a cryogenic pipe installation for conducting liquid hydrogen, comprising a valve arrangement according to any of the aforementioned embodiments.

According to another aspect, the invention provides a vehicle, especially an aircraft with at least one hydrogen consumer or a LH2 tank vehicle, comprising a valve actuating mechanism, a valve arrangement, and/or a cryogenic pipe installation according to any of the aforementioned embodiments.

According to another aspect, the invention provides an airport comprising a cryogenic pipe installation with such valve actuation mechanism according to any of the aforementioned embodiments.

Preferred embodiments can be used in the technical field of small molecule gas transportation to be controlled via valves subjected to very high leakage tightness requirements.

Preferred embodiments relate to gas tight membrane seals for rotation transmission. Preferred embodiments relate to a gas tight rotational seal. Preferred embodiments relate to hydrogen control and distribution equipment.

The invention especially lies on the technical field of hydrogen powered aircraft and installations related therewith. One of the challenges connected therewith is the integration of hydrogen control and distribution equipment. Shut-off and distribution ball valves are the preferred choice over piston valves or poppet valves. A challenge experienced with use of ball valves is that they require a rotational seal. It is quite difficult to provide a rotational seal such that it is gas tight for liquid hydrogen use. Thus, any dynamic movements would increase leakage. Leaking of larger amounts of H2 should be avoided for different reasons. This phenomenon is not present in a membrane sealed piston poppet valve due to the translational operation of the closing elements thereof.

Embodiments of the invention make use of a concept similar to a strain wave gearing (also called "harmonic drive") as known from reference [4]. In embodiments of the invention, a membrane transmits a torque moment to separate components involved in the mechanism.

In usual harmonic drives as known from reference [4], the outer-toothed wheel is usually fixed. This allows an inner ellipsoid gear, plus the toothed membrane to rotate. Similar to a planetary gear, the setup of the two moving parts around one steady one allows for simple maintenance.

According to embodiments of the invention, the flexible gear is formed by a part of a sealing membrane. The sealing membrane is stationary so that it can be tightly fixed within a housing, and it can securely seal an inner area of the housing from an outer area. Other as in usual harmonic drives the flexible gear, as part of the sealing membrane is fixed, while the outer wheel is rotatable relative to the housing. The wave generator has a rotatable element such as an ellipsoid gear or any other eccentric gear that is suitable to deform the flexible gear such that some of the outer teeth thereof engage some of the inner teeth of the outer wheel. Hence, rotational movement can be transmitted via gas tight stationary sealing.

Either the wave generator or the outer wheel could be used as input while the other thereof is used as output for actuating a valve. In preferred embodiments, the rotatable element of the wave generator is used as input for the rotational movement, and the outer wheel is used as output that can be connected to a rotating closing element of a valve such as a ball valve.

Ball valve shut-off valves have some advantages over piston valves for LH2 applications, particularly for the non-motorized ones. The challenge is that the actuation of the ball valve requires a shaft rotation which—as far as known—today cannot be designed leakage tight for very small molecular gases in a similar way as this is possible with a longitudinal actuation for a piston valve to be sealed by a membrane.

Embodiments of the invention make use of the principle of harmonic drive gear boxes such as known from reference [4] for transmitting rotational movements for actuating valves. This is especially useful for ball valves but of course also for all other valves that can be actuated—directly or indirectly—by a rotational movement.

One drawback could be that harmonic drive gearboxes usually have a transmission ratio more than 1:25 so that one needs more than six turns to close a ball valve with a 90° movement. Therefore, manual operation elements that easily can be turned several times are preferred such as cranks, hand wheels or crank levers. Of course, automatic rotation drive actuators such as stepper motors, electric actuators, hydraulic motors or pneumatic motors could also be connected to the input shaft.

Since there is no relative movement in the seal but the membrane uses its elastic deformation behavior, the achievable leakage rate is extremely low.

BRIEF DESCRIPTION OF THE DRAWINGS

Embodiments of the invention are explained below referring to the accompanying drawings in which:

FIG. 4 is a schematic perspective view of an aircraft comprising a valve arrangement of FIG. 3;

FIG. 5 is a schematic view of a tank vehicle comprising a valve arrangement of FIG. 3; and FIG. 6 is a schematic view of an airport comprising a valve arrangement of FIG. 3.

DETAILED DESCRIPTION OF THE PREFERRED EMBODIMENTS

Figure 1:
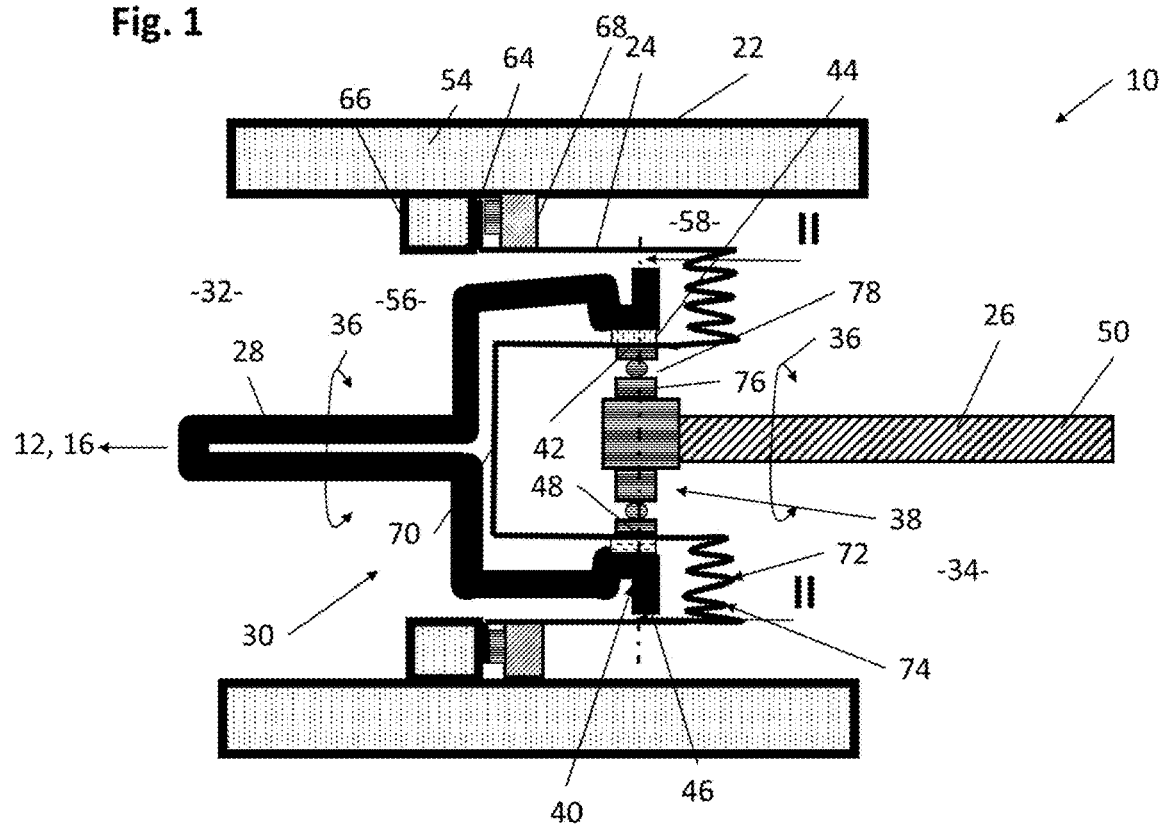
FIG. 1 is a schematic sectional view of a valve actuation mechanism according to an embodiment of the invention.
Figure 2:
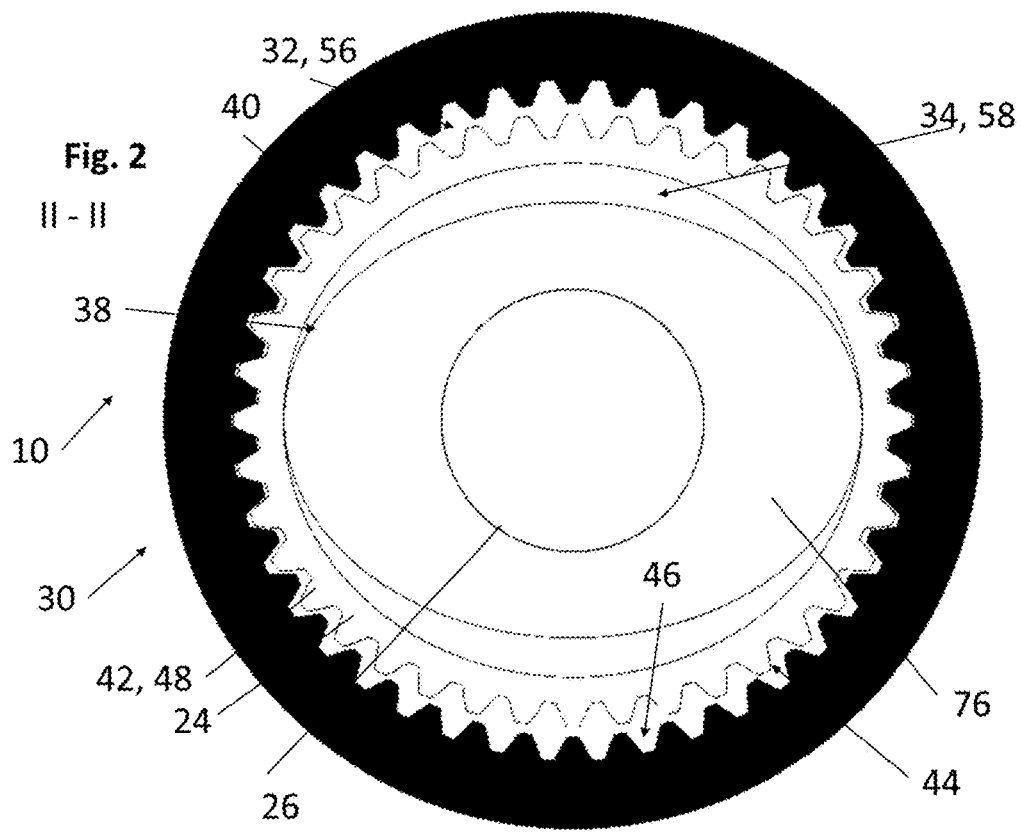
FIG. 2 is a sectional view along line II-II of FIG. 1.
Figure 3:
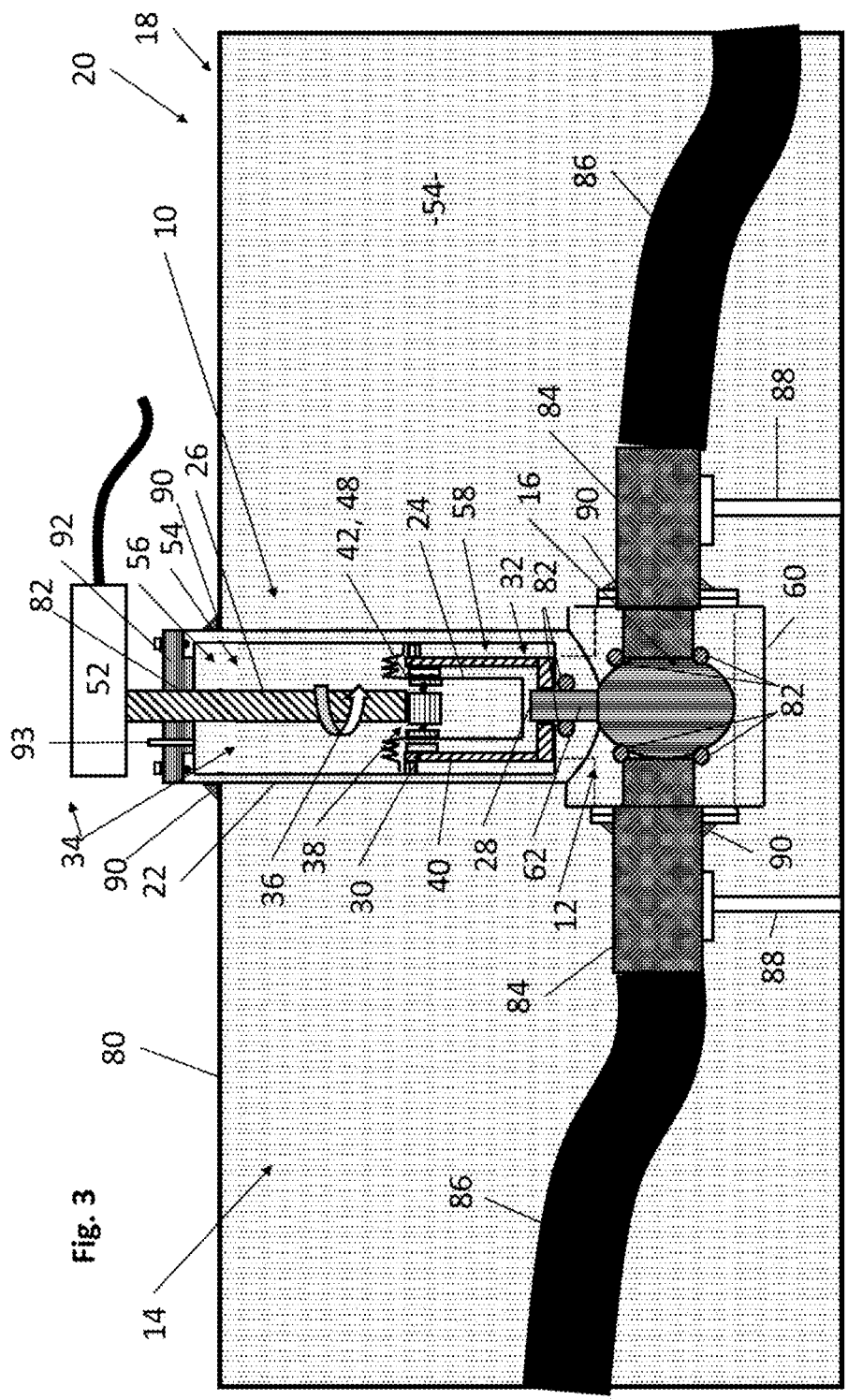
FIG. 3 is a schematic sectional view of a valve arrangement comprising a valve actuation mechanism according to an embodiment of the invention.

FIG. 1 shows a valve actuation mechanism 10 for actuating a valve 12 for cryogenic applications and/or H2 applications. FIG. 2 shows a section through parts of the valve actuation mechanism 10 along line II-II of FIG. 1. FIG. 3 shows a valve arrangement 14 including a valve 12 and the valve actuation mechanism 10 for actuating the valve 12.

The valve actuation mechanism 10 is configured to actuate a rotatable closing element 16 of the valve 12 in cryogenic applications and/or H2 applications. Especially, the valve arrangement 14 comprising the valve 12 and the valve actuation mechanism 10 is configured to control flow of liquid hydrogen in a cryogenic pipe installation 18 such as in a hydrogen distribution system 20.

Referring to FIGS. 1 and 2, the valve actuation mechanism 10 comprises a housing 22, a sealing membrane 24, an input shaft 26, an output shaft 28, and a strain wave gearing 30.

The housing 22 defines an inner area 32 sealed by the sealing membrane 24 from an outer area 34.

The input shaft 26 is configured to receive a rotational movement especially from a manually operated element such as a handle, a crank or a hand wheel (not shown). The input shaft 26 is arranged in the outer area 34.

The output shaft 28 is configured to be connected to the closing element 16 and is arranged in the inner area 32.

The strain wave gearing 30 connects the input shaft 26 and the output shaft 28 and transmits a rotational movement 36 from the input shaft 26 to the output shaft 28.

The strain wave gearing 30 comprises a wave generator 38 connected to one of the input and output shafts 26, 28, a rotatable outer gear wheel 40 connected to the other of the input and output shafts 26, 28 and a stationary flexible ring gear 42 with external teeth 44. The flexible ring gear 42 is deformed by the wave generator 38 to engage with internal gear teeth 46 of the outer gear wheel 40. According to embodiments of the invention, the flexible ring gear 42 is provided by a portion of the sealing membrane 24. In other words, a ring portion 48 of the membrane 24 is provided with the external teeth 44 and acts as the flexible ring gear 42 of the strain wave gearing 30.

The input shaft 26 can be, e.g., a shaft 50 of a manual lever, a driving shaft of a motorized actuator 52, a driving shaft of an electric actuator, a driving shaft of a pneumatic actuator, a shaft of a crank, a shaft of a crank lever, or a shaft of a handwheel.

In some embodiments, the housing 22 is configured as a sealed canister with a thermal insulation, especially with vacuum 54. In some embodiments, the housing 22 has a first sealed chamber 56 and a second sealed chamber 58. The chambers 56, 58 are sealed from each other by the membrane 24. The first sealed chamber 56 constitutes at least a part of the inner area 32 and encloses the output shaft 28. The second sealed chamber 58 forms a part of the outer area 34, wherein at least a portion of the input shaft 26 connected to the one of the wave generator 38 and the outer gear wheel 40 is arranged within the second sealed chamber 58.

Referring to FIG. 3, the housing 22 can be part of a valve housing 60 of the valve 12. According to some embodiments, the housing 22 is or has a removable screwed section of the valve housing 60, wherein the screw connection is sealed by a static seal. When connected, the first sealing chamber 56 receives a driven end 62 of the closing element 16. In some embodiments, the valve 12 is a ball valve or butterfly valve, and the closing element 16 comprises a rotating ball element or butterfly. The driven end 62 is connected for common rotation to the output shaft 28.

Referring to FIGS. 1 to 3, the membrane 24 comprises an outer rim portion 64 or flange portion fixedly connected to the housing 22. Especially, the rim portion 64 is clamped in a sealing manner between an inner flange 66 in the interior of the housing 22 and a clamping ring 68.

Further, the membrane 24 comprises a dome shaped or pot shaped center area 70 with an annular wall wherein at least an annular portion of the annular wall constitutes the ring portion 48 with the external teeth 44 as the flexible ring gear 42.

In some embodiments, the membrane 24 comprises an annular intermediate area 72 extending essentially radially with a wave shaped expansion portion. The intermediate area 72 is formed as a bellow 74 or has at least a bellow section. The intermediate area connects the pot shaped center area 70 to the rim portion 64 and provides good flexibility for an eccentric movement of the pot shaped portion 70 during a deformation induced by the wave generator 38. In some embodiments, the membrane 24 is made of metal.

In embodiments not shown, the wave generator 38 is connected to the output shaft 28, and the outer gear wheel 40 is connected to the input shaft 26. In the preferred embodiments as shown, the wave generator 38 is connected to the input shaft 26 and the outer gear wheel 40 is connected to the output shaft, and hence, to the closing element 16 of the valve 12.

The strain wave gearing 30 (also known as harmonic gearing) is a type of mechanical gear system that uses the flexible ring gear 42 (also called flexible spline) with external teeth 44, which is deformed by a rotating elliptical plug 76 to engage with the internal gear teeth 46 of the outer gear wheel 40 (also called outer spline).

The wave generator 38 comprises an elliptical disk called a wave generator plug 76 and an outer ball bearing 78. The elliptical plug 76 is inserted into the ball bearing 78, forcing the bearing 78 to conform to the elliptical shape but still allowing rotation of the plug 76 within the outer bearing 78.

The membrane 24 functioning as a seal and as a flexible spline is shaped like a shallow cup. Due to the form of the membrane 24, the membrane wall at the ring portion 48 is very flexible while the membrane 24 is rigid enough to be tightly secured to the housing in order to withstand torque induced therein. Teeth 44 are positioned radially around the outside of the flexible ring portion 48. The ring portion 48 fits tightly over the wave generator 38, so that when the wave generator plug 76 is rotated, the ring portion 48 deforms to the shape of a rotating ellipse and does not slip over the outer elliptical ring of the ball bearing 78. The ball bearing enables a smooth rotation of the wave generator 38 within the ring portion 48.

FIG. 3 shows the valve arrangement 14 with a ball valve as valve 12. The valve 12 is enclosed in a vacuum capsule 80 boundary. Dynamic seals 82 comprise seal elements of the valve 12 rotating relative to each other. A medium such as LH2 leaking through the dynamic seals 82 can only leak into the inner area 32, e.g., the first sealed chamber 56, but is prevented from leaking into the second sealed chamber 58 or other parts of the outer area 34 by means of the sealing membrane 24.

The valve 12 is configured as a shut-off ventil in a cryogenic pipe installation 18. The valve 12 comprises pipe sections 84 connected to hoses 86 or other ducts of the pipe installation 18. The valve 12 is spaced apart from walls of the capsule 80, e.g., by means of valve supports 88.

Connections between the pipe sections 84 and the valve housing 60, and between the canister, i.e., the housing 22 of the valve actuation mechanism 10 and the capsule are made with gas tight weld connections 90.

The second sealed chamber 58 is closed by a bolted removable cap 92 with static seal. A vacuum port 93 is provided, either as shown in the cap 92 or in the housing wall enclosing the second sealed chamber 58 in order to establish a vacuum in the second sealed chamber 58.

With the valve actuation mechanism 10, the vacuum integrity of the capsule 80 can be maintained, and rotational movement can be transmitted without the need of any dynamic seal. Hence, a very high safety against leakage of H2 is achieved.

As shown in FIGS. 4, 5, and 6, the cryogenic pipe installation 18 can be used in an aircraft 94 for controlling flow and distribution of LH2 from and to LH2 tanks 96, on board of a tank vehicle 98, for example for fueling aircraft, and on an airport 100, for example for distributing LH2 as aircraft fuel to aircraft parking positions 102.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 valve actuation mechanism
12 valve
14 valve arrangement
16 closing element
18 cryogenic pipe installation
20 hydrogen distribution system 22 housing
24 membrane
26 input shaft
28 output shaft
30 strain wave gearing
32 inner area
34 outer area
36 rotational movement
38 wave generator
40 outer gear wheel
42 flexible ring gear
44 external teeth
46 internal gear teeth
48 ring portion
50 shaft of a manual lever
52 actuator
54 vacuum
56 first sealed chamber
58 second sealed chamber
60 valve housing
62 driven end
64 rim portion
66 inner flange
68 clamping ring
70 pot shaped center area
72 intermediate area
74 bellow
76 elliptical plug
78 bearing
80 vacuum capsule
82 dynamic seal
84 pipe section
86 hose
88 valve support
90 weld connection
92 cap
93 vacuum port
94 aircraft
96 LH2 tank
98 tank vehicle
100 airport
102 parking position

The invention claimed is:

1. A valve actuation mechanism for actuating a rotatable closing element of a valve for at least one of cryogenic applications or hydrogen applications, comprising:
a housing defining an inner area which is sealed by a sealing membrane from an outer area,
an input shaft configured to receive a rotational movement wherein the input shaft is arranged in the outer area,
an output shaft configured to be connected to the closing element, wherein the output shaft is arranged in the inner area, and
a strain wave gearing connecting the input shaft and the output shaft, wherein the strain wave gearing comprises a wave generator connected to one of the input and output shafts, a rotatable outer gear wheel connected to the other one of the input and output shafts and a stationary flexible ring gear with external teeth which is deformed by the wave generator to engage with internal gear teeth of the outer gear wheel, wherein the flexible ring gear is provided as a portion of the sealing membrane,
wherein the sealing membrane comprises a pot shaped center area with an annular wall wherein at least a ring portion of the annular wall comprises the external teeth of the flexible ring gear.

2. A valve actuation mechanism according to claim 1, wherein the input shaft is selected from the group consisting of a shaft of a manual lever, a driving shaft of a motorized actuator, a driving shaft of an electric actuator, a driving shaft of a pneumatic actuator, a shaft of a crank, a shaft of a crank lever, and a shaft of a handwheel.

3. The valve actuation mechanism according to claim 1, wherein the housing comprises a canisterized housing with an internal vacuum.

4. The valve actuation mechanism according to claim 1, wherein the housing, defines the inner area as a first sealed chamber and further defines a second sealed chamber sealed by the sealing membrane from the first sealed chamber, wherein at least a portion of the input shaft and the one of the wave generator and the outer gear wheel connected thereto are arranged within the second sealed chamber.

5. The valve actuation mechanism according to claim 1, wherein the housing has a connection arrangement configured to be connected to a valve housing of a valve to be actuated.

6. The valve actuation mechanism according to claim 1, wherein the housing has a bolted removable cap with a static seal.

7. The valve actuation mechanism according to claim 1, wherein the sealing membrane comprises a deformable, bellow shaped, annular intermediate area extending essentially radially.

8. The valve actuation mechanism according to claim 1, wherein the sealing membrane comprises an outer rim portion or flange portion fixedly connected to the housing.

9. A valve arrangement for liquid hydrogen applications, comprising:
a valve with a closing element which is movable between a closed position and an open position by a rotational movement, and
a valve actuation mechanism according to claim 1.

10. The valve arrangement according to claim 9, wherein the valve is a ball valve or butterfly valve.

11. The valve arrangement according to claim 9, comprising a vacuum capsule boundary, wherein the housing is welded to the vacuum capsule.

12. A cryogenic pipe installation for conduction liquid hydrogen, comprising a valve arrangement according to claim 9.

13. A vehicle with at least one hydrogen consumer or liquid hydrogen tank, comprising a valve actuation mechanism according to claim 1.

14. A vehicle with at least one hydrogen consumer or liquid hydrogen tank, comprising a valve arrangement according to claim 9.

15. A vehicle with at least one hydrogen consumer or liquid hydrogen tank, comprising a cryogenic pipe installation according to claim 12.

16. An aircraft with at least one hydrogen consumer or liquid hydrogen tank, comprising a valve actuation mechanism according to claim 1.

17. An aircraft with at least one hydrogen consumer or liquid hydrogen tank, comprising a valve arrangement according to claim 9.

18. An aircraft with at least one hydrogen consumer or liquid hydrogen tank, comprising a cryogenic pipe installation according to claim 12.

19. An airport comprising a cryogenic pipe installation according to claim 12.

20. A valve actuation mechanism for actuating a rotatable closing element of a valve for at least one of cryogenic applications or hydrogen applications, comprising:

a housing defining an inner area which is sealed by a sealing membrane from an outer area, wherein the housing comprises a canisterized housing with an internal vacuum, an input shaft configured to receive a rotational movement wherein the input shaft is arranged in the outer area, an output shaft configured to be connected to the closing element, wherein the output shaft is arranged in the inner area, and a strain wave gearing connecting the input shaft and the output shaft, wherein the strain wave gearing comprises a wave generator connected to one of the input and output shafts, a rotatable outer gear wheel connected to the other one of the input and output shafts and a stationary flexible ring gear with external teeth which is deformed by the wave generator to engage with internal gear teeth of the outer gear wheel, wherein the flexible ring gear is provided as a portion of the sealing membrane.

* * * * *